United States Patent [19]
Peter

[11] Patent Number: 5,813,203
[45] Date of Patent: Sep. 29, 1998

[54] LOST MOTION LIFT CONTROL FOR A MOWER DECK

[75] Inventor: Tim Peter, Medina, Ohio

[73] Assignee: MTD Products Inc., Cleveland, Ohio

[21] Appl. No.: 678,652

[22] Filed: Jul. 12, 1996

[51] Int. Cl.⁶ .................................................. A01D 34/03
[52] U.S. Cl. ...................... 56/17.2; 56/15.8; 56/DIG. 22
[58] Field of Search ................................ 56/17.1, 17.2, 56/15.6, 15.7, 15.8, DIG. 14, DIG. 22

[56] References Cited

U.S. PATENT DOCUMENTS

| | | | |
|---|---|---|---|
| 3,283,486 | 11/1966 | Marek et al. ....................... | 56/DIG. 22 |
| 3,550,364 | 12/1970 | Musgrave .................................. | 56/15.8 |
| 3,696,594 | 10/1972 | Freimuth et al. ..................... | 56/15.8 X |
| 4,206,584 | 6/1980 | Johnston et al. ......................... | 56/15.8 |
| 4,321,783 | 3/1982 | Kawasaki et al. ....................... | 56/15.8 |
| 4,577,455 | 3/1986 | Amano et al. ..................... | 56/DIG. 22 |
| 4,760,687 | 8/1988 | Siegrist ............................. | 56/DIG. 22 |
| 4,869,057 | 9/1989 | Siegrist ................................. | 56/15.8 X |
| 5,029,437 | 7/1991 | Dobberpuhl ............................. | 56/15.8 |

*Primary Examiner*—Tamara L. Graysay
*Assistant Examiner*—Thomas A. Beach
*Attorney, Agent, or Firm*—Emerson & Associates

[57] ABSTRACT

An implement lift mechanism for a grounds care device uses a lost motion interconnection between a rotary lift flange and an integral lift/connector link coaxial therewith to selectively control the height of the implement. The lost motion interconnection allows the implement to float upwards over uneven terrain. Additionally, a spring can be used to assist in aiding the implement and reducing lift force.

26 Claims, 4 Drawing Sheets

LOST MOTION LIFT CONTROL FOR A MOWER DECK

FIELD OF THE INVENTION

This invention relates to a lost motion lift control for grounds care equipment and more particularly, in the preferred embodiment, a mower deck.

BACKGROUND OF THE INVENTION

Grounds care equipment is frequently utilized with some sort of additional implement. Examples include mower decks, front blades, and other customary implements. Typically, these ground care implements are either comparatively fixedly mounted to the frame of the grounds care vehicle allowing no upward or downward movement relative thereto or they may include some sort of floating mechanism which allows for relative movement therebetween. The underdeck lawnmower of the U.S. Pat. No. 3,461,654 is an example of a relatively complicated floating interconnection of a mower deck. In general, a free floating state is preferred for reducing strain on both the implement and the grounds care equipment.

OBJECTS AND SUMMARY OF THE INVENTION

It is an object of the present invention to provide for an effective lost motion interconnection between an implement height control and an implement in a grounds care vehicle.

It is another object of the present invention to simplify the configuration of lost motion interconnections.

It is yet another object of the present invention to reduce the physical size of lost motion interconnections.

It is still another object of the present invention to reduce the weight of lost motion interconnections.

It is a further object of the present invention to lower the cost of lost motion interconnections.

Other objects and a more complete understanding of the invention may be had by referring to the drawings in which:

BRIEF DESCRIPTION OF THE DRAWINGS

The structure, operation, and advantages of the presently disclosed preferred embodiment of the invention will become apparent upon consideration of the following description taken in conjunction with the accompanying drawings wherein.

DETAILED DESCRIPTION OF THE INVENTION

Figure 1:
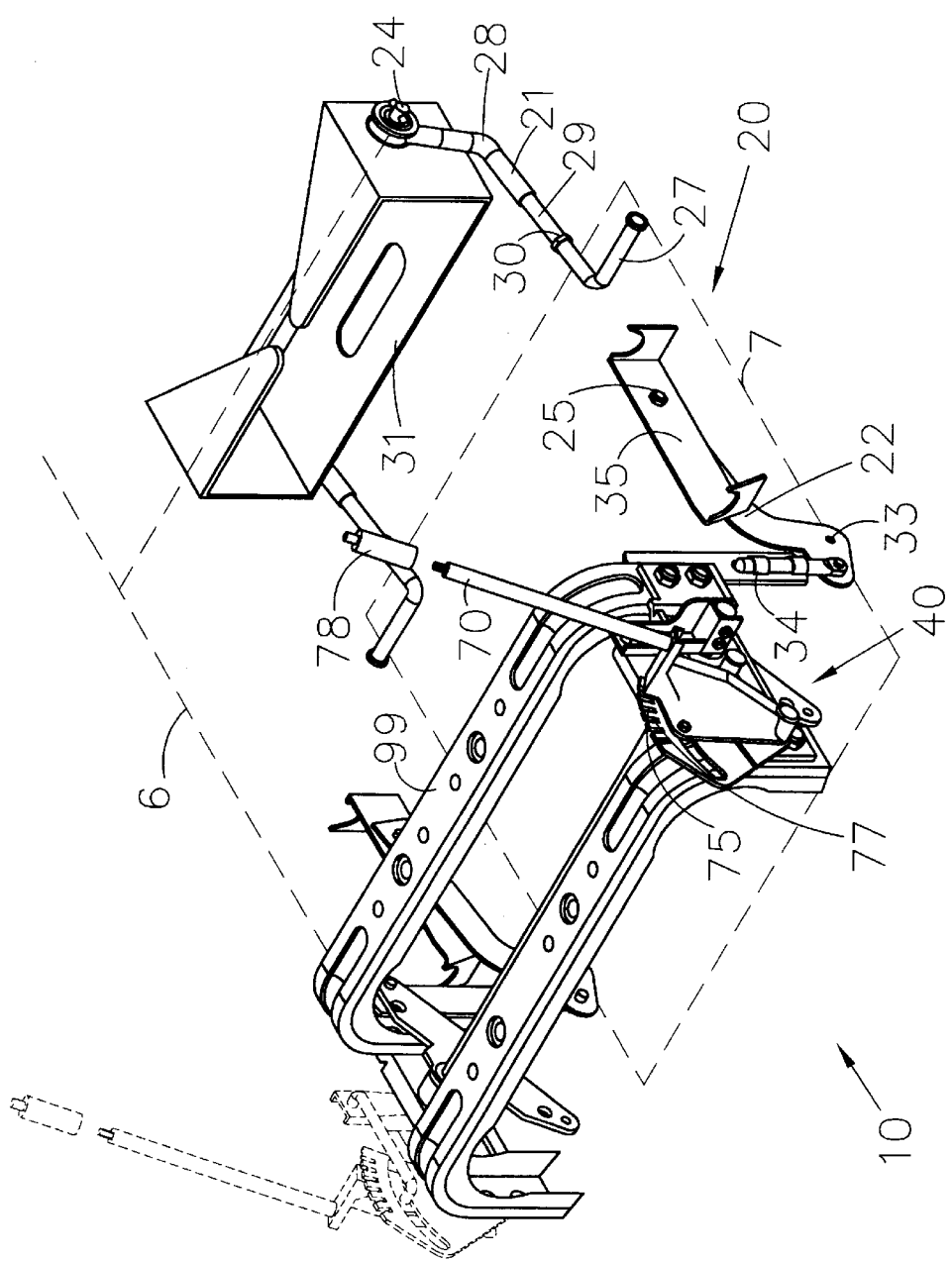
FIG. 1 is a perspective of a complete lift system incorporating the invention of the application.
Figure 5:
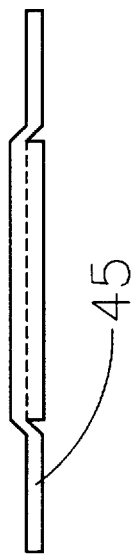

The lift of this invention is designed for use with a grounds care vehicle. The grounds care vehicle itself includes a motor, a frame, and an implement. The invention will be described for use in a zero turn mid-mount mower grounds care vehicle having a frame. The frame is shown in partial representational form as item 6 on the rear side of FIG. 1, the front side is similar. The frame is supported by wheels and a drive unit for travel over the ground in a manner known in the art. The particular implement is a multi-spindle mower deck which is suspended to the underside of the frame by the preferred height mechanism described. This mower deck is shown in representational form as item 7 in FIG. 1.

The lift 10 of this invention includes an implement suspension mechanism 20 and a lift/height control mechanism 40.

The implement suspension mechanism 20 serves to support and physically interconnect the implement with the grounds care vehicle. The type of implement suspension mechanism is not critical to the invention as long as it can be lifted and lowered by the substantially linear motion of the later described lift/height control mechanism 40.

The particular preferred implement suspension mechanism 20 disclosed is comprised of two pairs of pivot links 21, 22 mounted so as to form substantially a parallelogram between the frame of the grounds care vehicle and the attached implement—in this case the mowing deck.

Each of the pivot links 21, 22 is interconnected to the frame of the grounds care vehicle by a forwardly located pivot 24, 25 respectively.

The lower end of the front pivot link 21 is interconnected by a mounting pin 27 directly to the top of the mowing deck. These particular front pivot links 21 are formed of a substantially L shaped front section 28 in combination with an adjustable length rod 29 aftersection. The combination allows the selective shortening and lengthening of the distance between the mounting pin 27 and the pivot 24 of these links so as to control the fore and aft height relationship (by adjusting both sides simultaneously) as well as adjusting side to side uniformity (by adjusting one and/or the other of the two sides individually). A binding nut 30 selectively locks in the adjustment. The forward bracket 31 to which the pivot 24 is interconnected is physically welded to the frame 6 of the grounds care vehicle so as to solidly interconnect same.

The back pivot links 22 are substantially L shaped flat plates maintaining a fixed distance between the pivot 25 and the mower deck mounting hole 33. An adjustable connector 34 on the later described lift rod 42 on either side of the grounds care vehicle again allows the selective adjustment of the height and/or the angularity of the implement in respect to these back pivot links. This is occasioned by separating the lift rod 42 from the mower deck 7 and rotating the lift rod to adjust its length via the nut 36 of the connector 34. Refastening the lift rod 41 to the deck locks in the length. The fact that the nut 36 is retained in place in a slot 37 allows this adjustment.

The pivot 25 of the back pivot links 22 is fixedly connected via a fixed side rail mounting bracket 35 to the frame of the grounds care vehicle so as to provide for a solid mounting thereof.

With this type of pivot link mechanism, the upward movement of the mowing deck, directly or via one or a multiplicity of links, will control the mowing height of the entire deck; lifting one will lift all. It is preferred to lift either both back links or the deck between such links so as to accomplish the action with a pulling action for the entire suspension system. This also reduces the effect of cumulative tolerances.

Figure 3:
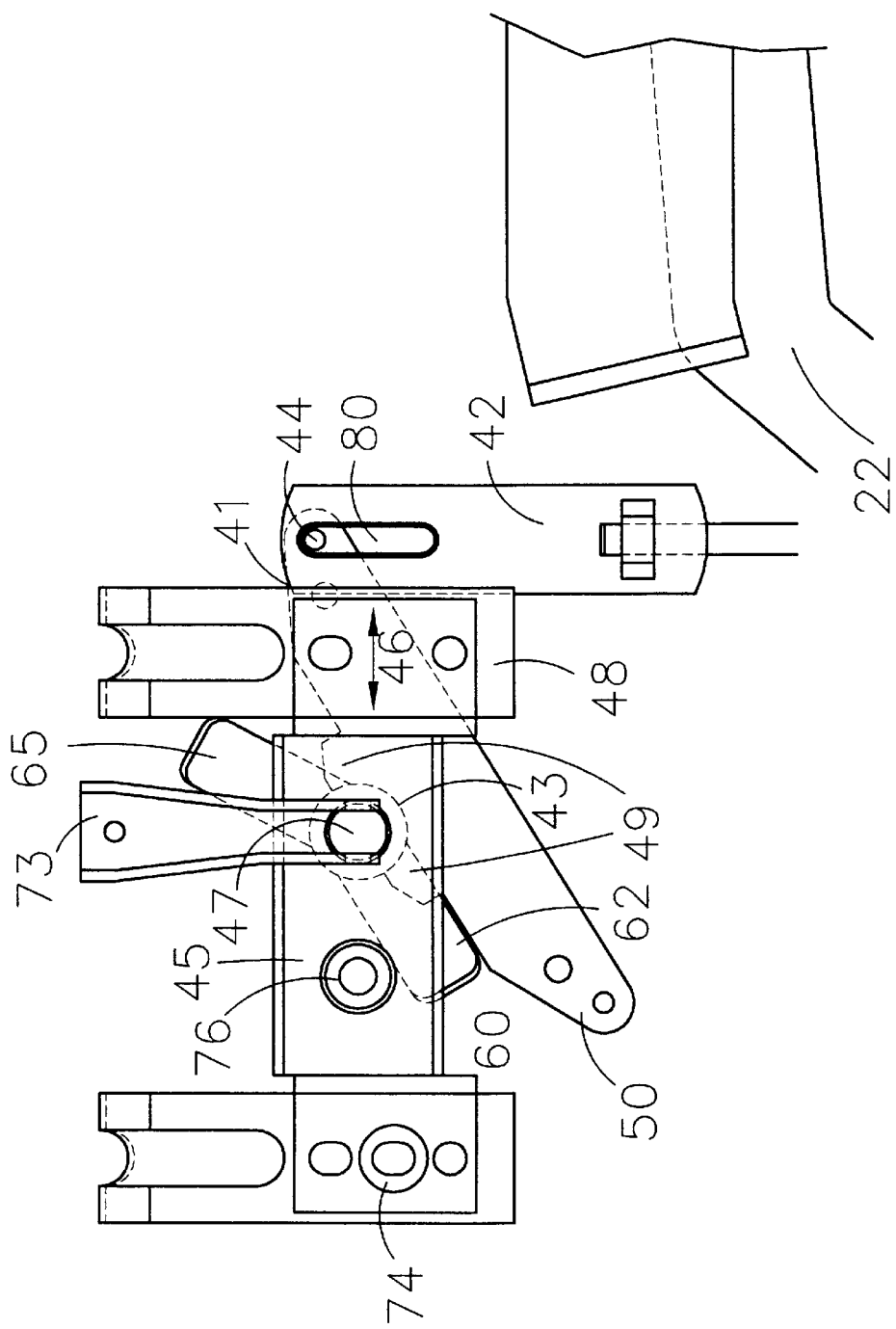
FIG. 3 is a partial cross-sectional view of the lift of FIG. 1.

The invention of the present application relates to the lift/height control mechanism 40 of the lift. This lift/height control mechanism 40 includes a connector link 41, a lift link 50, and a lost motion interconnection 60 to a lift handle (see FIG. 3).

The connector link 41 serves to translate the motion of the lift link 50 into the linear movement of a lift rod 42. This linear movement is thus available for selectively manipulating the physical relationship between the implement and the grounds care vehicle. This linear movement can be upwards and downwards as shown in the preferred embodiment or it could be in any other direction within 360° through the angular reorientation of the various parts. It is preferred that the connector link 41 be separate from the later described lift link 50 so as to separate the two functions. This allows for a more adaptable design.

The particular connector link 41 disclosed is mounted to the frame of the vehicle to rotate about a rotary axis 47. The preferred rotary axis 47 itself (and most of the lift/height control 40) is mounted to the frame by two brackets 45 that extend longitudinally between the two substantially "C" shaped members 99 which are part of the frame 6. The brackets 45 are bolted to the flat side sections 48 of such members 99 so as to form an integral assembly. This strengthens the suspension and lift as well as allowing modular construction of at least this part of the grounds care device.

The rotary axis 47 allows for the angular displacement of the connector link 41 in respect to the frame. This creates a relatively arcuate movement of a pin 44 at the end of the link 41. This arcuate movement is modified into a substantially linear movement by the interdisposition of the lift rod 42 between the connector link and the implement suspension mechanism.

In the preferred embodiment disclosed, the rotary axis 47 of the connector link 41 is coextensive with the rotary shaft 61 of the later described lost motion interconnection 60 with the connector link 41 itself rotatively supported to such shaft 61 by a bearing 43 therebetween. In the preferred embodiment disclosed this is accomplished by welding a cylindrical sleeve bearing 43 to two upward extending arms 49 of the connector link 41 so as to form an integral whole freely rotating about the shaft 61 subject to the later described lost motion interconnection 60 (and helper springs etal). This preferred location reduces the number of parts necessary to produce the lift 10 of the present invention (i.e. the rotary shaft 61 performs two functions). Under certain circumstances it may be desirable to displace the rotary axis 47 from the shaft 61. For example extra movement or leverage could be provided by doing so and by separately adjusting the lengths of the lift link 50 and lift flange 62. In addition the differing arcs about displaced axis of rotation could be used to accomplish an additive and/or similar result.

The distance 46 between the rotary axis 47 and the pin 44 at the end of the link 41 is chosen in conjunction with the length of the lift handle and the location and leverage of the lost motion interconnection to optimize the effort/distance of travel efficiency of the lift 10. In the preferred embodiment disclosed, this distance 46 is approximately 4.6 inches.

The lift link 50 serves to interconnect the lost motion interconnection 60 with the connector link 41. The location and orientation of this lift link 50 is selected in consideration of the direction of force of the lost motion interconnection relative to the direction of force of the lift rod 42.

In the particular embodiment disclosed, the lift link 50 is integral with the connector link 41 extending on the opposite side of the lift rod 42 and using the same bearing 43. Due to this, any downward motion on the lift link 50 will be transferred into upward motion of the connector link/lift rod interconnection (and thus the attached mower deck implement). In alternate embodiments, the lift link 50 could be integral with the connector link 41 on the same side of the rotary axis 47 such that upward movement of the lost motion interconnection 60 would be transferred into upward motion of the connector link 41. Again, both or either could be modified throughout the 360° spectrum movement which is available for the various parts. For example an L shaped combination using upward motion on the lift link 50 to provide backward motion of the connector link/lift rod interconnection.

The lost motion interconnection 60 completes the invention of the application. This lost motion interconnection 60 provides a force on the lift link 50 in one direction which force allows the floating of the lift link 50 in an unrestrained manner further than that set by the lost motion interconnection 60. The lost motion interconnection thus sets the base dimension for the attached implement, which base dimension can be increased unrestrainedly without hindrance. This allows the operator to set the relative positioning between the implement and frame of the grounds care vehicle with the knowledge that, although this particular dimension is pre-set, it can be increased automatically upon the imposition of forces, the forces typically beyond the operators control such as the unevenness of the terrain over which the vehicle is traveling.

The particular lost motion interconnection 60 disclosed includes the previously described lift link 50, a rotary shaft 61, a lift flange 62, and a deck lift handle 70.

The rotary shaft 61 serves to interconnect lost motion interconnection 60 to the frame of the grounds care vehicle. In the particular embodiment disclosed this is accomplished through the previously set forth brackets 45. The preferred lost motion interconnection is duplicated on both sides of the vehicles so as to equalize lateral lifting forces. The preferred rotary shaft 61 thus extends across the frame to operate on both sides and in addition ensures that both lost motion interconnections operate simultaneously.

The lift flange 62 serves to set the minimum height for the implement suspension mechanism 20. In that this interconnection is indirect, the implement suspension mechanism 20 is free to float above the height set by the lift flange 62.

The particular lift flange disclosed is solidly interconnected to the rotary shaft 61 for rotation therewith. In that the positioning of the rotary shaft 61 is under direct control of the deck lift handle 70, any positioning set by the deck lift handle 70 will establish the minimum dimension for the implement suspension mechanism 20.

The deck lift handle 70 is interconnected to the rotary shaft 61 so as to selectively position the lift flange 62, thus setting the minimum height for the implement suspension mechanism 20.

Figure 2:
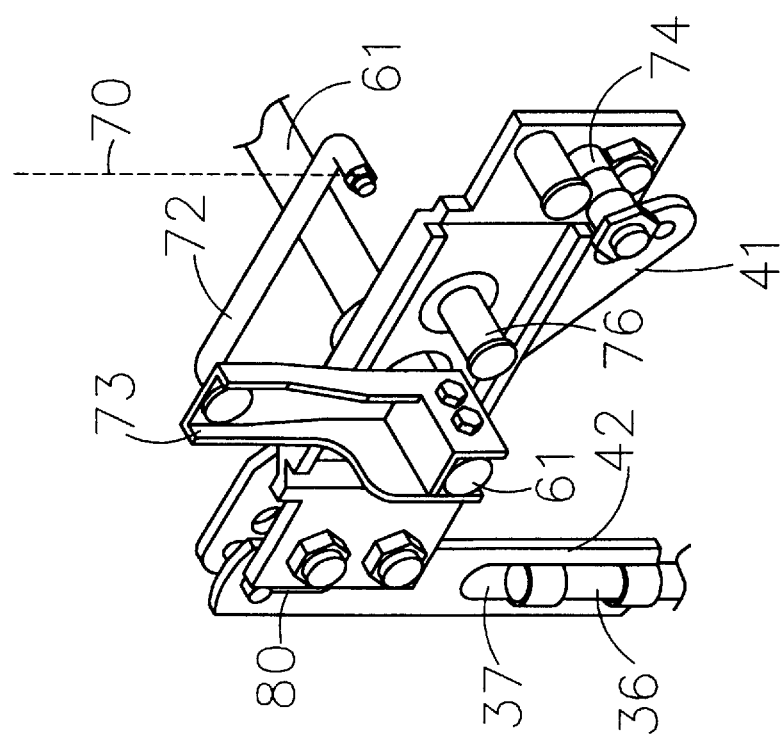
FIG. 2 is a perspective view of a section of the lift of FIG. 1.

In the preferred embodiment disclosed, the deck lift handle 70 is interconnected to the frame by a pivot shaft 74 via the previously set forth bracket 45. Its axis of rotation is displaced from the rotary shaft 61, to which it is connected through an actuation rod 72 and an actuation bracket 73 (see FIG. 2). This allows for the lateral displacement of the deck lift handle 70 from the rotational axis of the rotary shaft 61. (Preferred for reasons later described).

In this respect, it is noted that in the preferred embodiment disclosed, the operational forces are substantially 180° opposite to each other—that is for downward movement of the lift link 50, upward movement of the lift rod 42 is occasioned.

In the preferred embodiment disclosed, in order to avoid duplication of parts, the lift link 50 utilizes as its rotary axis the same rotary axis as the connector link 41 and in addition, as is especially preferred, the axis of rotation of the rotary shaft 61 of the lost motion interconnection. This result, occasioned in the preferred embodiment by having the lift link 50 on the opposite side of the connector link 41/lift rod 42 interconnection, is preferred so as to separate the two operations. This reduces the complexity of the device. This also allows for the lateral displacement of the deck lift handle 70 from the rotation axis of the 61, thus to position the deck lift handle 70 in a position most suitable for the particular embodiment disclosed. This also reduces the number of parts and complexity of the lift 10.

In alternate embodiments, the deck lift handle 70 may be directly interconnected to the rotary shaft 61 for direct control thereof. It is noted that this does, however, reduce the range of parameters that can be adjusted as later described. For example by altering the relative lengths of the actuation bracket 73 from the shaft 61 in respect to the interconnection of the actuation rod 72 to the deck handle lift 70 from the handles own pivot 74 it is possible, in modifications of this preferred embodiment, to create force/movement amplification and/or reduction—thus to compensate for the particular forces which might be necessary for any particular implement suspension mechanism 20. In the preferred embodiment disclosed, the distances are substantially equal. These distances provide for the inclusion of a height plate 75 to the deck lift handle, which height plate does not interfere with the connector link or any associated parts of the axis of rotation of the lift handle 70.

The displacement provides other parameters for adjustment. For example a) the distance of displacement, b) the direction of displacement, c) the distance from the axis of the shaft 61 to the actuation rod hole in the actuation bracket, d) the distance from the axis of rotation 74 of the deck lift handle 70 to the actuation rod connection thereto etc. all can be coordinated with the other parameters so as to optimize the force/movement interconnection between the deck lift handle and the mowing deck. In general one first selects the torque and angular displacement of the deck lift handle, one then determines the required lift and force required for the implement (or range thereof) and one subsequently adjusts the other parameters to provide for both.

The preferred height plate 75 is mounted about the pivot shaft 74 and interconnected to a height plate interlock 76 directly through bracket 45 to the frame of the grounds care vehicle. This locks the plate 75 to the frame against rotation while also creating a similar arc for both the height plate notches 77 and lift handle lock pawl (later described). This provides for a good interconnection therebetween so as to provide for accurate control of the height of the implement suspension mechanism 20. The operator by pressing a release 78 at the end of the deck lift handle 70 selectively interengages a lock pawl with grooves 77 in the height plate 75 so as to set a minimum height for the implement suspension mechanism 20. Due to the lost motion interconnection 60 between the lift flange 62 and the lift link 50 the implement is free to float above this dimension upon the upward application of force. The implement is thus free to float upwards without harm to either the implement, the frame, and/or the interconnection therebetween. Note that in the preferred embodiment a float stop 65 prevents the connector link (and deck) from rising over a set height, for example to protect the components from damage.

In the particular embodiment disclosed, a free floating slot 80 between the connector link 41 and the lift rod 42 allows for a further increase in upwards travel of the implement in respect to the frame of the grounds care vehicle without harm. This is preferred in that, subject to the implement or any component directly interconnected thereto connecting the frame or other physical part of the grounds care vehicle, upwards motion occasions no harm. It is further preferred that this slot 80 is localized between two plates so as to form a box section. This allows pin 44 to be the shank of a bolt, supported at both ends. This strengthens this location against any and all forces.

Although the invention has been described as preferred embodiment with a certain degree of particularity, it is to be understood that numerous changes can be made without deviating from the invention as here and after claimed.

Figure 4:
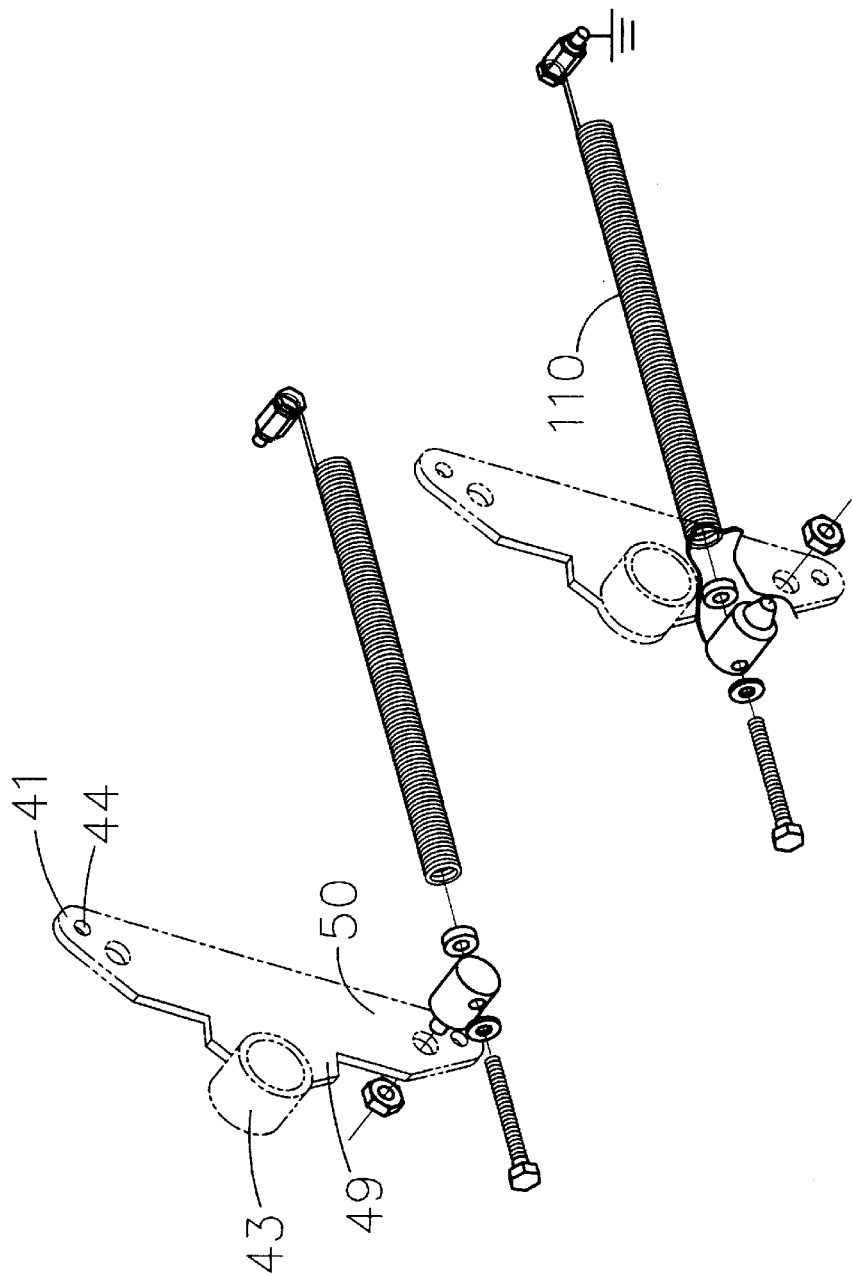
FIG. 4 is a view of an improvement of added helper springs to the lift of FIG. 1; and, FIG. 5 is a downward view of the mounting bracket for the lift of FIG. 1.

Additionally, a spring 110 (or other means to apply force) can be used to aid the lost motion device in helping the implement float over uneven terrain. By connecting this spring 110 to the lift link 50, an upward force is created on the implement 7. This compensates for the weight thereof (see FIG. 4). Higher forces can be applied to both increase float and lower lift force. These forces can be varied to suit the weight of the implement to give to desired float or lift effort.

What is claimed:

1. An improved lift control for an implement having a deck connected to a frame by at least one link, the improvement comprising a rotary shaft,
    said rotary shaft being rotatively supported by the frame,
    a connector link, said connector link extending off of said rotary shaft,
    said connector link having an end and a topside, said end of said connector link being connected to the link, a deck lift handle and lost motion interconnection means to interconnect said deck lift handle to said connector link said lost motion interconnection means directly contacting said topside of said connector link.

2. The lift control of claim 1 characterized in that said lost motion interconnection means directly contacts said connector link.

3. The lift control of claim 2 characterized in that said connector link has an underside.

4. The lift control of claim 3 characterized in that said connector link has a connector link end and said lost motion interconnection means contacts said connector link between said rotary shaft and said end.

5. The lift control of claim 3 characterized in that said connector link has a connector link end and said lost motion interconnection means contacts said connector link on the other side of said end from said rotary shaft.

6. The lift control of claim 2 characterized in that said connector link has a connector link end and said connector link has a portion that extends on the other side of said rotary shaft from said end.

7. The lift control of claim 1 characterized by the addition of a lift link, said lift link extending off of said rotary shaft, and said lost motion interconnection means directly contacts said lift link.

8. The lift control of claim 7 characterized in that said lift link extends from said rotary shaft on the same side thereof as said connector link.

9. The lift control of claim 8 characterized in that said lift link has an underside and said lost motion interconnection means contacts said underside.

10. The lift control of claim 7 characterized in that said lift link extends from said rotary shaft on the other side as said connector link.

11. The lift control of claim 8 characterized in that said lift link has a topside and said lost motion interconnection means contacts said topside.

12. The lift control of claim 8 characterized in that said lost motion interconnection means includes rotatively mounting said deck lift handle to the frame.

13. The lift control of claim 12 characterized in that the rotational axis of said deck lift handle is coextensive with the rotational axis of said rotary shaft.

14. The lift control of claim 12 characterized in that the rotational axis of said deck lift handle is not-coextensive with the rotational axis of said rotary shaft.

15. The lift control of claim 14 characterized in that said rotational axis of said deck lift handle and said connector link are located on a side of said rotary shaft.

16. The lift control of claim 14 characterized in that said rotational axis of said deck lift handle and said connector link are located on opposing sides of said rotary shaft.

17. An improved lift control for a mower deck connected by a first pair of links and a second pair of links pivotally interconnected to a frame in a parallelogram configuration, the improvement comprising a deck lift handle, and lost motion interconnection means to interconnect said deck lift handle to one of the first or second pair of links so as to allow the upward floating of such deck, said lost motion interconnection means having a counter-force spring connected to the frame of the device.

18. The improved lift control of claim 17 characterized in that said lost motion interconnection means includes a connector link, mounting means to rotatively mount said connector link to the frame, said connector link having an end on one side of said mounting means, one end of said connector link being interconnected to at least one of said second pair of links, and lift link means to rotate said connector link in respect to the frame.

19. The improved lift control of claim 18 characterized in that said lift link means is located on a side of said connector end of said connector link.

20. The improved lift control of claim 19 characterized in that said lift link means is located below said end of said connector means.

21. The improved lift control of claim 19 characterized in that said connector link has a second end on the opposite side of said mounting means and said lift link means is located above said second end of said means.

22. The improved lift control of claim 18 characterized in that said deck lift handle and said connector link have a differing axis of rotation.

23. The improved lift control of claim 18 characterized by the addition of said connector link being adjustable to adjust the height and angularity of the mower deck in respect to the ground.

24. The improved lift control of claim 17 characterized in that said lost motion interconnection means includes a floating pivot rod to the frame of the device.

25. The improved lift control of claim 17 characterized in that said lost motion interconnection means includes a height plate, said height plate being pivotally connected to said deck lift handle and selectable means to lock said deck lift handle to said height plate so as to adjust the height of the mower deck.

26. The improved lift control of claim 17 characterized by said lost motion interconnection means including a lift connection rod and said lift connection rod contacting both of said first or second pair of links.

* * * * *